(12) United States Patent
Seabaugh et al.

(10) Patent No.: US 7,871,735 B2
(45) Date of Patent: Jan. 18, 2011

(54) CERAMIC LAMINATE STRUCTURES

(75) Inventors: Matthew M. Seabaugh, Columbus, OH (US); Katarzyna Sabolsky, Westerville, OH (US); Michael J. Day, Dublin, OH (US)

(73) Assignee: Nextech Materials, Ltd., Lewis Center, OH (US)

( * ) Notice: Subject to any disclaimer, the term of this patent is extended or adjusted under 35 U.S.C. 154(b) by 674 days.

(21) Appl. No.: 10/977,318

(22) Filed: Oct. 29, 2004

(65) Prior Publication Data

US 2006/0093884 A1  May 4, 2006

(51) Int. Cl.
*H01M 8/10* (2006.01)
*H01M 6/04* (2006.01)
*B05D 5/12* (2006.01)

(52) U.S. Cl. .................. 429/491; 429/188; 427/115
(58) Field of Classification Search .............. 429/188, 429/491
See application file for complete search history.

(56) References Cited

U.S. PATENT DOCUMENTS

| 4,639,356 A * | 1/1987 | O'Toole et al. ............ 423/266 |
| 2002/0048701 A1* | 4/2002 | Ukai et al. ................ 429/33 |
| 2003/0232230 A1* | 12/2003 | Carter et al. ............... 429/32 |

* cited by examiner

*Primary Examiner*—Patrick Ryan
*Assistant Examiner*—Karie O'Neill Apicella
(74) *Attorney, Agent, or Firm*—Porter, Wright, Morris & Arthur LLP (57) ABSTRACT

Ceramic laminate structures, particularly laminate structures including stabilized zirconia compositions, as well as electrodes and electrochemical cells including such laminate structures. The stabilized zirconia composition preferably are selected from scandia-stabilized zirconia and yttria-stabilized zirconia. These laminate structures enhance the overall flexural strength of the electrolyte layer while preserving high electrical conductivity. Such laminate structures may be useful in electrochemical fuel cells such as solid oxide fuel cells.

29 Claims, 4 Drawing Sheets

CERAMIC LAMINATE STRUCTURES

CROSS-REFERENCE TO RELATED APPLICATIONS

Not applicable

STATEMENT REGARDING FEDERALLY SPONSORED RESEARCH

Not applicable

REFERENCE TO MICROFICHE APPENDIX

Not applicable

FIELD OF THE INVENTION

This invention relates to ceramic laminate structures, particularly laminate structures including stabilized zirconia compositions, as well as electrodes and electrochemical cells including such laminate structures. Such laminate structures may be useful in electrochemical fuel cells such as solid oxide fuel cells.

BACKGROUND OF THE INVENTION

Commercial solid oxide fuel cells (SOFC) require both high performance and high mechanical integrity at a reasonable cost. Conventional cells for SOFC stacks have sought to achieve high performance by reducing the thickness of the electrolyte layer. As the electrolyte thickness has been reduced to less than ~150 microns, it has become necessary for manufacturers to support the electrolyte layer with a mechanical support layer. Designs are being pursued that rely on the anode, cathode, and in some cases an inert layer, to serve as the load bearing member of the cell. While such approaches have been successful from an electrochemical perspective, the resultant mechanical properties of anode and cathode supported cells have required significant design compromises that limit overall performance of the systems. Enhancement of the mechanical strength of thin electrolyte layers to maintain an electrolyte-supported cell would provide significant advantages in cell stability and stack sealing.

Commercial SOFCs also requires high-quality, high-reproducibility seals. The critical parameters necessary for high-quality, high-reproducibility sealing are (1) that the cells be reproducibly flat, and (2) that the edges of the cells be dense. Electrolyte-supported cells, in which the mechanical support for the cell is a solid electrolyte, are more suited for simple sealing arrangements, because the porous electrode layer does not extend to the edge of the cell.

The difficulty of sealing SOFC stacks drives system designers toward larger planar cell areas. The larger the cell area, the fewer the number of repeat parts, such as interconnect plates, seals and other auxiliary components. These materials contribute significantly to stack weight, cost, thermal management, and reliability. Planar SOFC cells generally offer better configurations for high gravimetric power density stacks than tubular cells, provided that the sealing and mechanical integrity of the cells is sufficient for the application. The manufacture of large area SOFC components is difficult: the larger the area of the cell, the more likely that a performance-limiting flaw such as a crack, pinhole or other small defect will compromise the entire cell. For anode-supported cells, the primary challenges are maintaining flatness and electrolyte perfection over these large areas. Anode and cathode supported cells face serious issues during processing because of the sintering mismatch between the two electrode support layer and the dense electrolyte layer.

The difficulties associated with cell size and cell architecture relate to yet another potential barrier, the mechanical strength of the fuel cell in portable power supplies or vehicles. The support and the electrolyte layer must be mechanically stable for long periods of time at high temperature. The formation of defects or cracks in the electrolyte will critically affect the performance of a single cell and even the stack. The strength of the support and electrolyte layer becomes especially important when the cell area is increased, making the probability of critical flaws greater. Anode-supported cells based on various nickel-based cermet compositions inherently fail due to residual anode/electrolyte stresses developed during processing or stresses developed during redox processes. Overall, planar anode-supported cell designs show low potential as a stable platform for prolonged high temperature operations. Electrolyte-supported designs have a much greater potential for high temperature applications, since in this case, the support is composed of a singular composition which possesses respectable mechanical properties and is stable in both oxidizing and reducing atmospheres.

The use of SOFCs for applications such as transportation auxiliary power units requires extremely high levels of reliability. For planar stack geometries, which offer the highest gravimetric and volumetric efficiencies, the mechanical strength of the support structure of the cell is of paramount importance. To increase the strength, metal supports must be used or the relative strength of the ceramic support must be increased.

SUMMARY OF THE INVENTION

The present invention provides laminate structures of stabilized zirconia compositions. These laminate structures enhance the overall flexural strength of the electrolyte layer while preserving the high electrical conductivity desired in SOFC applications. This invention may allow SOFC manufacturers to overcome the significant mechanical strength issues presented by large area cell and stack manufacturing.

The invention includes an electrolyte, an electrolyte supported anode, an electrolyte supported cathode, an electrolyte supported electrochemical cell, and methods of making the same. In one embodiment, a self-supporting laminate electrolyte structure may comprise at least one sheet of a first ceramic electrolyte material, at least one sheet of a second ceramic electrolyte material positioned above the first ceramic electrolyte material, and at least one sheet of the first electrolyte material positioned above the second ceramic electrolyte material, the sheets being laminated and then sintered to form a composite structure. In another embodiment, a electrolyte may comprise outer layers of a first ceramic electrolyte material and at least one inner layer of a second ceramic electrolyte material sandwiched the outer layers, the layers being laminated and then sintered to form a composite electrolyte structure.

An electrolyte supported anode may comprise an anode applied to an outer layer of the above-described composite structure. An electrolyte supported cathode may comprise a cathode applied to an outer layer of the above-described composite structure. An electrolyte-supported electrochemical cell may comprise an anode applied to an outer layer of the above-described composite structure and a cathode applied to the other outer layer of the composite structure.

A method of making a self-supporting laminate electrolyte structure may comprise the steps of providing at least one sheet of a first ceramic electrolyte material, positioning at least one sheet of a second ceramic electrolyte material above the first layer, positioning at least one sheet of a first electrolyte material above the second ceramic electrolyte material and laminating and sintering the layers to form a composite structure. A method of making an electrolyte supported anode may comprise the step of applying an anode to an outer layer of a composite structure prepared according to the steps described above. A method of making an electrolyte supported cathode may comprise the step of applying a cathode to an outer layer of a composite structure prepared according to the steps described above. A method of making an electrolyte-supported electrochemical cell may comprise the steps of applying an anode to an outer surface of a composite structure prepared according to the steps described above and applying a cathode to the other outer layer of the composite structure. The invention also includes laminate electrolyte structures, anodes, cathodes, and electrochemical cells prepared by the above-described processes.

BRIEF DESCRIPTION OF THE DRAWINGS

These and further objects of the invention will become apparent from the following detailed description.

DETAILED DESCRIPTION OF CERTAIN PREFERRED EMBODIMENTS

The present invention provides laminate structures of stabilized zirconia compositions. These laminate structures enhance the overall flexural strength of the electrolyte layer while preserving the high electrical conductivity desired in SOFC applications. The stabilized zirconia compositions preferably are selected from scandia-stabilized zirconia and yttria-stabilized zirconia. The laminate structures may include fully and partially stabilized zirconia compositions.

In the laminate structures of the present invention, the inner layer of fully-stabilized zirconia provides high ionic conductivity to the composite. The outer layers of partially-stabilized zirconia enhance the mechanical strength of the structure relative to a conventional single layer structure for two reasons; the higher mechanical strength of the partially stabilized phase and the compressive stress exerted on the layer arising from the thermal expansion mismatch between the inner and outer layers.

Figure 1:
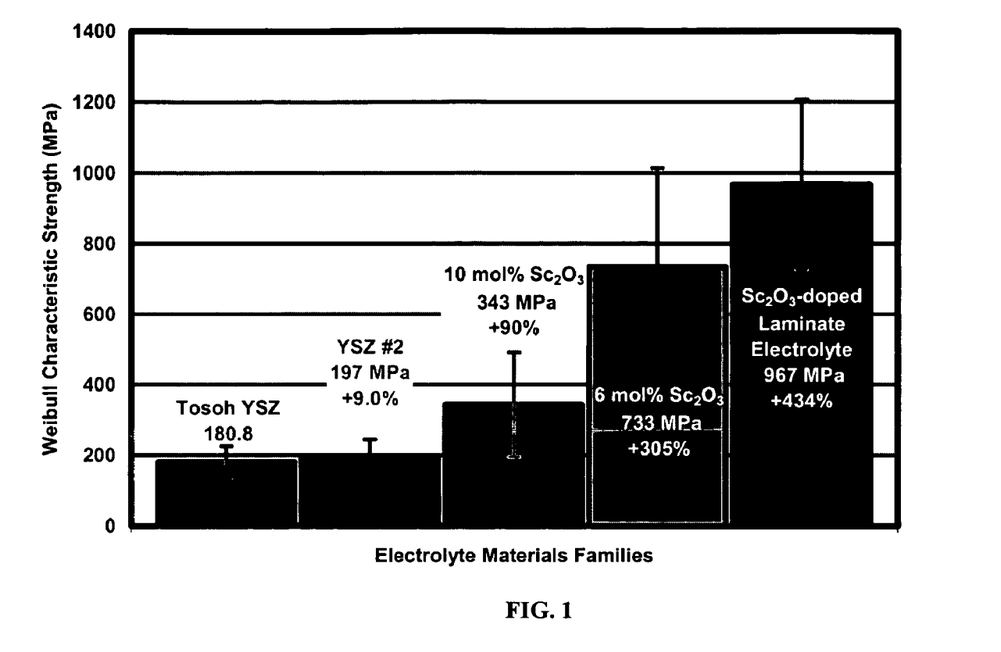
FIG. 1 is a graph comparing the mechanical strength of various zirconia-based electrolytes.

FIG. 1 shows the relative flexural strength of several conventional support plates and a laminate support plate of the present invention. The average Weibull flexural strength (at room temperature) was measured for yttria-stabilized zirconia (YSZ), scandia-stabilized zirconia (6-mol % $Sc_2O_3$) (6ScSZ), and scandia-stabilized zirconia (10 mol % $Sc_2O_3$) (10ScSZ) supports as well as a scandia-stabilized zirconia (ScSZ) laminate architecture, all with similar support thicknesses. Tremendous improvements in electrolyte strength can be achieved (967 versus 180 MPa at room temperature) with the laminate structure of the present invention.

Figure 2:
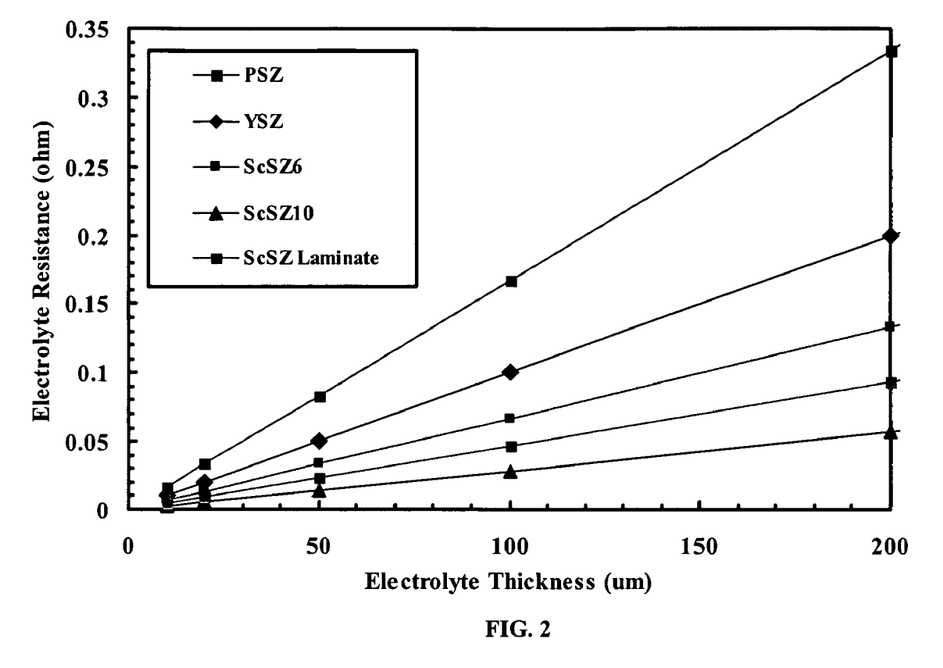
FIG. 2 is a graph comparing the calculated electrical conductivity of various zirconia-based electrolytes.

ScSZ has been found to exhibit ionic conductivities ranging from 0.15 to 0.5 S/cm (at 1000° C.) with $Sc_2O_3$ contents between 5 and 12 mol %. These levels of conductivity are nearly 1.5-5 times as large as YSZ. FIG. 2 shows the relative electrical conductivity for the disclosed laminate compositions. The average calculated conductivity for the laminate (0.21 S/cm) structures is more than twice that of fully stabilized YSZ at the same temperature. A mechanically sound 30-50 μm electrolyte layer made using this laminate approach may be expected to have the equivalent electrical resistance of a 15-20 μm thick YSZ layer.

As shown in FIG. 1, YSZ electrolyte-supported cells that are 150 μm in thickness have an average strength in the 180-200 MPa range. Such cells are difficult to handle and to manufacture and will not suffice for applications requiring high mechanical strength. Self-supporting zirconia layers as thin as ~50 μm have been prepared but they typically have been produced using PSZ ($ZrO_2$ containing 3-mol % $Y_2O_3$). The flexural strength of PSZ is ~800-1000 MPa (at room temperature); however, the PSZ composition has much lower ionic conductivity (~0.06 S/cm at 1000° C.), making PSZ only nominally interesting for SOFCs.

The use of fully stabilized ScSZ rather than fully stabilized YSZ resulted in a significant enhancement in conductivity (0.35 S/cm versus 0.1 S/cm at 1000° C.) and strength (343 MPa at room temperature). It would appear that the use of fully stabilized ScSZ in a 75 μm layer would provide ~6 times lower resistance while bearing an equivalent load to that of a 150 micron thick YSZ layer. While the increase in conductivity is significant, even greater mechanical strength can be obtained by evaluating the partially stabilized ScSZ6 (6 mol % $Sc_2O_3$), where more than three times the strength (733 MPa at room temperature) can be achieved with equivalent conductivity of YSZ.

However, the greatest advantages may lie in the development of laminate structures, which offer an excellent mixture of mechanical strength and ionic conductivity. Laminate structures may be constructed by laminating green (preceramic) sheets prepared from at least two different ceramic electrolyte materials. The sheets may be prepared from a slurry of the corresponding ceramic electrolyte material, e.g., by tape casting, screen printing, spray deposition, sequential tape casting, or other methods well known in the relevant art. The slurry also may include polymeric binders that provide plasticity and a pyrolyzable fugitive phase that prevent densification of the support layer.

The laminate structures may have outer layers of a first ceramic electrolyte material (each of which may comprise one or more sheets of preceramic material) with a central or inner layer of a second ceramic electrolyte material (which may comprise one or more sheets of preceramic material) sandwiched between the outer layers. The first and second ceramic electrolyte materials may be stabilized zirconia compositions. Preferably, the inner layer is a fully stabilized zirconia composition. The stabilized zirconia compositions may be selected from scandia-stabilized zirconia and yttria-stabilized zirconia. Preferably, the first and second ceramic electrolyte materials are selected from scandia-stabilized zirconia of different concentrations (mol % $Sc_2O_3$), although they also may be selected from other ceramic electrolyte materials (e.g., yttria-stabilized of different concentrations (mol % $Y_2O_3$) or combinations thereof (e.g., yttria-stabilized zirconia for the first material and scandia-stabilized zirconia as the second material. Preferably, the inner layer is a fully stabilized zirconia composition.

The prepared first and second ceramic electrolyte materials are cut into sheets of a desired size, stacked in a desired arrangement, and laminated to form a composite structure. Preferably, the sheets are arranged symmetrically with at least one sheet of the first ceramic electrolyte material on the top and bottom of the stack with at least one sheet of a second ceramic electrolyte material between them. The sheets are consolidated by pressure and/or heat treatment to form a monolith. The laminate material is then cut into shapes and sintered to densify the laminate material.

The invention includes tri-layer composite plates fabricated by laminating a 10ScSZ sheet between two 6ScSZ green sheets and sintering the tri-layer structure, designated as a 6/10/6 structure. These materials were selected to obtain the benefits of both the high mechanical strength of the 6ScSZ composition and the high ionic conductivity of the 10ScSZ composition. The total thickness of the tri-layer support may be about ~150-160 μm, containing a dense ~60 μm thick 10ScSZ layer between two dense 50 μm thick 6ScSZ layers. Obviously, thinner layers can be used to make laminated structures that provide similar mechanical strength advantages and even less electrical resistance.

The flexural strength and Weibull modulus (at room temperature) of ceramic plates were measured using the concentric ring technique (ASTM Standard Test Method for Monotonic Equibiaxial Flexural Strength of Advanced Ceramics at Ambient Temperature C 1499-01). All of these plates were ~150-200 μm in thickness. The strengths for unreduced and reduced Ni/YSZ support plates were measured for 8YSZ plates, 6ScSZ and 10ScSZ plates, and tri-layer ScSZ plates. The results are shown in Table 1. The 8YSZ and anode plates showed the lowest strength values (134 to 187 MPa), as was expected, and the strength values measured for 6ScSZ (~734 MPa) and 10ScSZ (~310 MPa) plates were as expected and in accordance with literature data.

TABLE 1

Room Temperature Flexural Strength of Anode and Electrolyte Supports

| Material | Average Strength (MPa) | Weibull Modulus |
| --- | --- | --- |
| NiO/YSZ (unreduced) | 145 ± 24 | 13.1 |
| Ni/YSZ (reduced) | 134 ± 18 | 16.4 |
| YSZ-8 | 187 ± 45 | 9.0 |
| ScSZ10 | 310 ± 148 | 4.0 |
| ScSZ6 | 670 ± 280 | 4.7 |
| ScSZ (6/10/6) | 737 ± 186 | 8.3 |
| ScSZ (6/10-10/6) | 909 ± 241 | 7.3 |

However, the strength values measured on tri-layer ScSZ electrolyte plates were actually larger than single-phase plates of either of the constituent 6ScSZ and 10ScSZ compositions. The 6/10/6 and 6/10-10/6 showed flexural strengths of approximately 737 MPa and 909 MPa, respectively. Without wishing to be bound by theory, we believe the increased strength of tri-layer electrolyte plates may relate to the modification of stress states within the various layers caused by slight differences in thermal expansion or phase transitions between the 6ScSZ and 10ScSZ compositions. Regardless of the explanation, the result provides a heretofore unprecedented combination of high mechanical strength and high ionic conductivity. With such a high strength, it should be possible to reduce electrolyte thickness to well below 100 microns, while maintaining ionic conductivity substantially greater than the conventional 8YSZ electrolyte composition. In conjunction with higher operating temperatures, electrolyte resistance should become essentially negligible.

The invention also includes multi-layer composite structures containing greater thicknesses of the 10ScSZ composition. Structures containing twice the 10ScSZ thickness are designated 6/10/10/6 structures and those containing three time the 10SCSZ thickness are designed 6/10/10/10/6 structures The invention further includes multi-layer composite plates fabricated by laminating two sheets of a 6ScSZ sheet between two 10ScSZ sheets and sintering the tri-layer structure.

Detailed descriptions of fabrication of a comparative (prior art) substrate and the above-described laminate structures of the present invention are provided below. In the examples, the sheets used to prepare the laminate structures are prepared by tape casting; however, as described above, sheets useful in the practice of this invention also may be prepared by other methods well known in the art.

EXAMPLE 1

6 Mol % ScSZ Electrolyte Substrate (Prior Art)

A conventional electrolyte substrate was prepared using dense 6 mol % scandia-stabilized zirconia (6ScSZ, Daiichi Kigenso Kaguku Kogyo Co., Ltd. 6 Sc1AlSZ, SSA=8.704 $m^2$/g). The tape casting slurry was prepared in 500 ml Nalgene bottles. A bottle was filled with 300 g media (5 mm diameter, zirconia), 92.75 g solvent (1:1 ratio of xylene and ethanol, GFS Chemicals), 4.12 g diluted Blown Menhaden Fish Oil dispersant (Richard E. Mistler, Inc., DZ3) (15 wt % fish oil in a 1:1 ratio of xylene and ethanol), and 179.04 g 6ScSZ powder. The bottle was sealed and shaken to mix the ingredients, then placed on a ball mill for 4 hours. After 4 hours of milling, the bottle was removed and 5.88 g poly (butylbenzyl phthalate) (Richard E. Mistler, Inc., PBBP), 5.88 g poly(alkylene glycol) (Richard E. Mistler, Inc., PPAG), and 12.34 g poly(vinyl butyral) (Richard E. Mistler, Inc., B-98) were added. The bottle was resealed and placed on a ball mill for 12 hours. The milled slurry was decanted into a 250 ml Nalgene bottle and placed on a mill for one hour to de-air. The slurry was cast onto silicon-coated Mylar (Richard E. Mistler, Inc., G10JRM). The thickness of the dry tape was 64 μm. The tape was cut into 15×15 cm sheets and set aside.

Four 15×15 cm sheet of 6ScSZ were placed on a piece of silicon-coated mylar covering a metal lamination plate. The sheets was covered with another sheet of silicon-coated mylar. The resulting 6ScSZ stack was sealed in heat sealable bags (Kapak Corporation, model 505) and laminated in an isostatic laminator (Flow Autoclave Systems, Inc., LIL81005-SS) at 80° C. and 2000 psi. The laminate was then cut into 2.5 cm diameter circles using a laser cutting system (Universal Laser System, Inc., M-300). The circles were placed on porous setters (Seelee, Micromass). The setters with the laminates were then placed in a high temperature furnace (Carbolite, Inc., RHF 15/35) for binder burnout and sintering.

EXAMPLE 2

Tri-layer Electrolyte Structure with a Single Sheet of 10 Mol % ScSZ Between 6 Mol % ScSZ Sheets A partially stabilized zirconia composition was prepared using dense 6 mol % scandia-stabilized zirconia powder (6ScSZ, Daiichi Kigenso Kaguku Kogyo Co., Ltd. 6 Sc1AlSZ, SSA=8.704 m$^2$/g). The tape casting slurry was prepared in 500 ml Nalgene bottles. A bottle was filled with 300 g media (5 mm diameter, zirconia), 92.75 g solvent (1:1 ratio of xylene and ethanol, GFS Chemicals), 4.12 g diluted Blown Menhaden Fish Oil dispersant (Richard E. Mistler, Inc., DZ3) (15 wt % fish oil in a 1:1 ratio of xylene and ethanol), and 179.04 g 6ScSZ powder. The bottle was sealed and shaken to mix the ingredients, then placed on a fast ball mill for 4 hours. After 4 hours of milling, the bottle was removed and 5.88 g poly(butylbenzyl phthalate) (Richard E. Mistler, Inc., PBBP), 5.88 g poly(alkylene glycol) (Richard E. Mistler, Inc., PPAG), and 12.34 g poly(vinyl butyral) (Richard E. Mistler, Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, Inc., G10JRM). The thickness of the dry tape was 64 µm. The tape was cut into 15×15 cm sheets and set aside.

A fully stabilized zirconia composition were prepared using dense 10 mol % scandia-stabilized zirconia powder (10ScSZ, Daiichi Kigenso Kaguku Kogyo Co., Ltd. 10Sc1AlSZ, SSA=10.4 m$^2$/g). The tape casting slurry was prepared in 500 ml Nalgene bottles. A bottle was filled with 300 g media (5 mm diameter, zirconia), 46.37 g solvent (1:1 ratio of xylene and ethanol, GFS Chemicals), 2.06 g diluted Blown Menhaden Fish Oil dispersant (Richard E. Mistler, Inc., DZ3) (15 wt % fish oil in 1:1 ratio of xylene and ethanol), and 89.52 g 10ScSZ powder. The bottle was sealed and shaken to mix the ingredients, then placed on a fast ball mill for 4 hours. After 4 hours of milling, the bottle was removed and 2.94 g poly(butylbenzyl phthalate) (Richard E. Mistler, Inc., PBBP), 2.94 g poly(alkylene glycol) (Richard E. Mistler, Inc., PPAG), and 6.17 g poly(vinyl butyral) (Richard E, Mistler, Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, Inc., G10JRM). The thickness of the dry tape was 42 µm. The tape was cut into 15×15 cm sheets and set aside.

Figure 3:
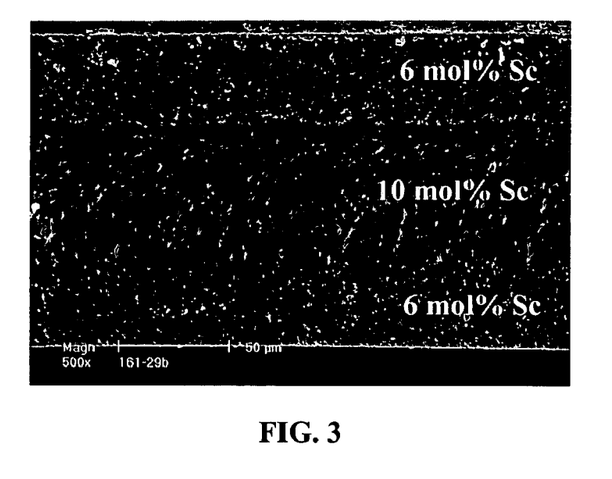
FIG. 3 is an SEM micrograph of a tri-layer electrolyte structure with a single sheet of 10 mol % ScSZ.

One 15×15 cm sheet of 6ScSZ was placed on a piece of silicon-coated Mylar covering a metal lamination plate. One 15×15 cm sheet of 10ScSZ was placed on top of the 6ScSZ sheet. Finally, one sheet of 6ScSZ was placed on top of the other two sheets and covered with one piece of silicon-coated Mylar. The resulting 6ScSZ/10ScSZ/6ScSZ stack was sealed in heat sealable bags (Kapak Corporation, model 505) and laminated in an isostatic laminator (Flow Autoclave Systems, Inc., LIL81005-SS) at 80° C. and 2000 psi. The laminate was then cut into 2.5 cm diameter circles using a laser cutting system (Universal Laser System, Inc., M-300). The circles were placed on porous setters (Seelee, Micromass). The setters with the laminates were then placed in a high temperature furnace (Carbolite, Inc., RHF 15/35) for binder burnout and sintering. The sintered samples were evaluated by SEM, as shown in FIG. 3.

EXAMPLE 3

Multi-Layer Electrolyte Structure with Two Sheets of 10 Mol % ScSZ Between 6 Mol % ScSZ Sheets A partially stabilized zirconia composition was prepared using dense 6 mol % scandia-stabilized zirconia powder (6ScSZ, Daiichi Kigenso Kaguku Kogyo Co., Ltd. 6Sc1AlSZ, SSA=8.704 m$^2$/g) electrolyte tapes. The tape casting slurry was prepared in 500 ml Nalgene bottles. A bottle was filled with 300 g media (5 mm diameter, zirconia), 92.75 g solvent (1:1 ratio of xylene and ethanol, GFS Chemicals), 4.12 g diluted Blown Menhaden Fish Oil dispersant (Richard E. Mistler, Inc., DZ3) (15 wt % fish oil in a 1:1 ratio of xylene and ethanol), and 179.04 g 6ScSZ powder. The bottle was sealed and shaken to mix the ingredients, then placed on a fast ball mill for 4 hours. After 4 hours of milling, the bottle was removed and 5.88 g poly(butylbenzyl phthalate) (Richard E. Mistler, Inc., PBBP), 5.88 g poly(alkylene glycol) (Richard E. Mistler, Inc., PPAG), and 12.34 g poly(vinyl butyral) (Richard E. Mistler, Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, Inc., G10JRM). The thickness of the dry tape was 64 µm. The tape was cut into 15×15 cm sheets and set aside.

A fully stabilized zirconia composition was prepared using dense 10 mol % scandia-stabilized zirconia powder (10ScSZ, Daiichi Kigenso Kaguku Kogyo Co., Ltd. 10Sc1AlSZ, SSA=10.4 m$^2$/g) electrolyte tapes were prepared in 500 ml Nalgene bottles. A bottle was filled with 300 g media (5 mm diameter, zirconia), 46.37 g solvent (1:1 ratio of xylene and ethanol, GFS Chemicals), 2.06 g diluted Blown Menhaden Fish Oil dispersant (Richard E. Mistler, Inc., DZ3) (15 wt % fish oil in a 1:1 ratio of xylene and ethanol), and 89.52 g 10ScSZ powder. The bottle was sealed and shaken to mix the ingredients, then placed on a fast ball mill for 4 hours. After 4 hours of milling, the bottle was removed and 2.94 g poly(butylbenzyl phthalate) (Richard E. Mistler, Inc., PBBP), 2.94 g poly(alkylene glycol) (Richard E. Mistler, Inc., PPAG), and 6.17 g poly(vinyl butyral) (Richard E, Mistler, Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, Inc., G10JRM). The thickness of the dry tape was 42 µm. The tape was cut into 15×15 cm sheets and set aside.

Figure 4:
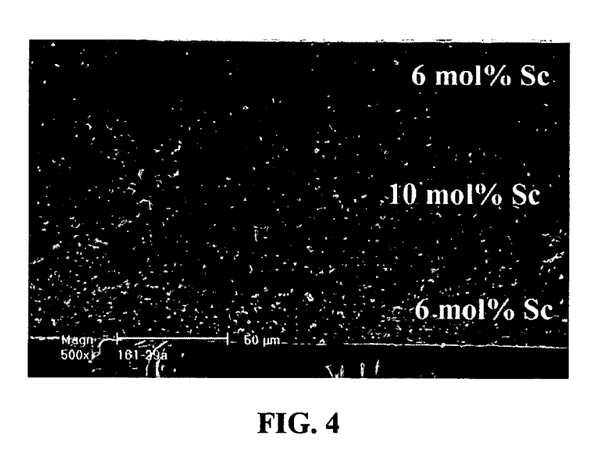
FIG. 4 is an SEM micrograph of a multi-layer electrolyte structure with two sheets of 10 mol % ScSZ.

One 15×15 cm sheet of dense 6ScSZ was placed on a piece of silicon-coated Mylar covering a metal lamination plate. Two 15×15 cm sheets of dense 10ScSZ were placed on top of the 6ScSZ sheet. Finally, one sheet of dense 6ScSZ was placed on top of the other three sheets and covered with one piece of silicon-coated Mylar. The resulting 6ScSZ/10ScSZ/10ScSZ/6ScSZ stack was sealed in heat sealable bags (Kapak Corporation, model 505) and laminated in an isostatic laminator (Flow Autoclave Systems, Inc., LIL81005-SS) at 80° C. and 2000 psi. The laminate was then cut into 2.5 cm diameter circles using a laser cutting system (Universal Laser System, Inc., M-300). The circles were placed on porous setters (Seelee, Micromass). The setters with the laminates were then placed in a high temperature furnace (Carbolite, Inc., RHF 15/35) for binder burnout and sintering. The sintered samples were evaluated by SEM, as shown in FIG. 4.

EXAMPLE 4

Multi-layer Electrolyte Structure with Three Sheets of 10 Mol % ScSZ Between 6 Mol % ScSZ Sheets A partially stabilized zirconia composition was prepared using dense 6 mol % scandia-stabilized zirconia powder (6ScSZ, Daiichi Kigenso Kaguku Kogyo Co., Ltd. 6Sc1AlSZ, SSA=8.704 m$^2$/g). The tape casting slurry was prepared in 500 ml Nalgene bottles. A bottle was filled with 300 g media (5 mm diameter, zirconia), 92.75 g solvent (1:1 ratio of xylene and ethanol, GFS Chemicals), 4.12 g diluted Blown Menhaden Fish Oil dispersant (Richard E. Mistler, Inc., DZ3) (15 wt % fish oil in a 1:1 ratio of xylene and ethanol), and 179.04 g 6ScSZ powder. The bottle was sealed and shaken to mix the ingredients, then placed on a fast ball mill for 4 hours. After 4 hours of milling, the bottle was removed and 5.88 g poly(butylbenzyl phthalate) (Richard E. Mistler, Inc., PBBP), 5.88 g poly(alkylene glycol) (Richard E. Mistler, Inc., PPAG), and 12.34 g poly(vinyl butyral) (Richard E. Mistler, Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, G10JRM). The thickness of the dry tape was 64 µm. The tape was cut into 15×15 cm sheets and set aside.

A fully stabilized zirconia composition was prepared using dense 10 mol % scandia-stabilized zirconia powder (ScSZ, Daiichi Kigenso Kaguku Kogyo Co., Ltd. 10Sc1AlSZ, SSA=10.4 m²/g). The tape casting slurry was prepared in 500 ml Nalgene bottles. A bottle was filled with 300 g media (5 mm diameter, zirconia), 46.37 g solvent (1:1 ratio of xylene and ethanol, GFS Chemicals), 2.06 g diluted Blown Menhaden Fish Oil dispersant (Richard E. Mistler, Inc., DZ3) (15 wt % fish oil in a 1:1 ratio of xylene and ethanol), and 89.52 g 10ScSZ powder. The bottle was sealed and shaken to mix the ingredients. The bottle was placed on a fast ball mill for 4 hours. After 4 hours of milling, the bottle was removed and 2.94 g poly(butylbenzyl phthalate) (Richard E. Mistler, Inc., PBBP), 2.94 g poly(alkylene glycol) (Richard E. Mistler, Inc., PPAG), and 6.17 g poly(vinyl butyral) (Richard E. Mistler, Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, Inc., G10JRM). The thickness of the dry tape was 42 µm. The tape was cut into 15×15 cm sheets and set aside.

Figure 5:
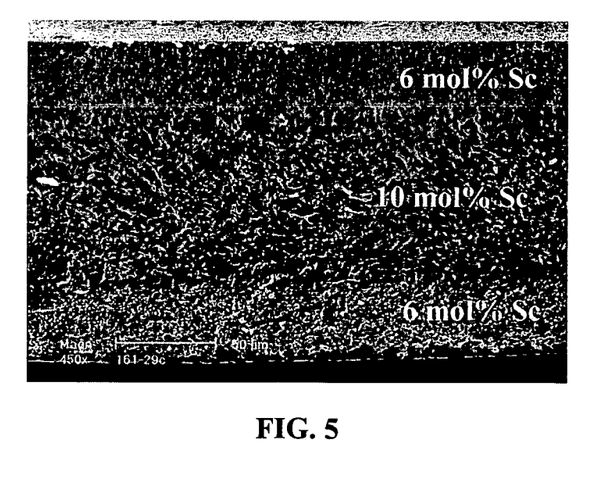
FIG. 5 is an SEM micrograph of a multi-layer electrolyte structure with three sheets of 10 mol % ScSZ between 2 sheets 6 mol % ScSZ.

One 15×15 cm sheet of 6ScSZ was placed on a piece of silicon-coated Mylar covering a metal lamination plate. Three 15×15 cm sheets of 10ScSZ were placed on top of the 6ScSZ sheet. Finally, one sheet of 6ScSZ was placed on top of the other four sheets and covered with one piece of silicon-coated Mylar. The resulting 6ScSZ/10ScSZ/10ScSZ/10ScSZ/6ScSZ stack was sealed in heat sealable bags (Kapak Corporation, model 505) and laminated in an isostatic laminator (Flow Autoclave Systems, Inc., LIL81005-SS) at 80° C. and 2000 psi. The laminate was then cut into 2.5 cm diameter circles using a laser cutting system (Universal Laser System, Inc., M-300). The circles were placed on porous setters (Seelee, Micromass). The setters with the laminates were then placed in a high temperature furnace (Carbolite, Inc., RHF 15/35) for binder burnout and sintering. The sintered samples were evaluated by SEM, as shown in FIG. 5.

EXAMPLE 5

Multi-layer Electrolyte Structure with Two Sheets of Dense 6 Mol % ScSZ Between Dense 10 Mol % ScSZ A fully stabilized zirconia composition was prepared using dense 10 mol % scandia-stabilized zirconia powder (10ScSZ, Daiichi Kigenso Kaguku Kogyo Co., Ltd. 10Sc1AlSZ, SSA=10.4 m²/g). The tape casting slurry was prepared in 500 ml Nalgene bottles. A bottle was filled with 300 g media (5 mm diameter, zirconia), 92.75 g solvent (1:1 ratio of xylene and ethanol, GFS Chemicals), 4.12 g diluted Blown Menhaden Fish Oil dispersant (Richard E. Mistler, Inc., DZ3) (15 wt % fish oil in a 1:1 ratio of xylene and ethanol), and 179.04 g 10ScSZ powder. The bottle was sealed and shaken to mix the ingredients, then placed on a fast ball mill for 4 hours. After 4 hours of milling, the bottle was removed and 5.88 g poly(butylbenzyl phthalate) (Richard E. Mistler, Inc., PBBP), 5.88 g poly(alkylene glycol) (Richard E. Mistler, Inc., PPAG), and 12.34 g poly(vinyl butyral) (Richard E, Mistler, Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, Inc. G10JRM). The thickness of the dry tape was 70 µm. The tape was cut into 15×15 cm sheets and set aside.

A partially stabilized zirconia composition was prepared using dense 6 mol % scandia-stabilized zirconia powder (6ScSZ, Daiichi Kigenso Kaguku Kogyo Co., Ltd. 6Sc1AlSZ, SSA=8.704 m²/g). The tape casting slurry was prepared in 500 ml Nalgene bottles. A bottle was filled with 300 g media (5 mm diameter, zirconia), 92.75 g solvent (1:1 ratio of xylene and ethanol, GFS Chemicals), 4.12 g diluted Blown Menhaden Fish Oil dispersant (Richard E. Mistler, Inc., DZ3) (15 wt % fish oil in a 1:1 ratio of xylene and ethanol), and 179.04 g 6ScSZ powder. The bottle was sealed and shaken to mix the ingredients, then placed on a fast ball mill for 4 hours. After 4 hours of milling, the bottle was removed and 5.88 g poly(butylbenzyl phthalate) (Richard E. Mistler, Inc., PBBP), 5.88 g poly(alkylene glycol) (Richard E. Mistler, Inc., PPAG), and 12.34 g poly(vinyl butyral) (Richard E. Mistler, Inc., B-98) were added. The bottle was resealed and placed on a slow ball mill for 12 hours. The milled slurry was decanted into a 250 ml Nalgene bottle and placed on a slow mill for one hour to de-air. The slurry was cast onto silicon-coated Mylar (Richard E. Mistler, Inc., G10JRM). The thickness of the dry tape was 40 µm. The tape was cut into 15×15 cm sheets and set aside.

One 15×15 cm sheet of dense 10ScSZ was placed on a piece of silicon-coated Mylar covering an aluminum lamination plate. Two 15×15 cm sheet of dense 6ScSZ was placed on top of the 10ScSZ. Finally, one sheet of dense 10Sc1AlSZ was placed on top of the three other sheets and covered with one piece of silicon-coated Mylar.

The resulting 10ScSZ/6ScSZ/6ScSZ/10ScSZ stack was sealed in heat sealable bags (Kapak Corporation, model 505) and laminated in an isostatic laminator (Flow Autoclave Systems, Inc., LIL81005-SS) at 80° C. and 2000 psi. The laminate was then cut into 2.5 cm diameter circles using a laser cutting system (Universal Laser System, Inc., M-300). The circles were placed on porous setters (Seelee, Micromass). The setters with the laminates were then placed in a high temperature furnace (Carbolite, Inc., RHF 15/35) for binder burnout and sintering.

Substrates from Examples 1-5 were tested for mechanical strength using ASTM Standard Test Method C 1499. Table 2 compares the collected data on the multi-layer electrolyte structure to conventional substrates of 8 mol % yttria-stabilized zirconia, 6 mol % scandia-stabilized zirconia, and 10 mol % scandia-stabilized zirconia. The data show that the laminate structures of Examples 2, 3, and 4 exhibit higher mechanical strength than substrates of 6 ScSZ or 10 ScSZ alone. Further, Example 5, in which the fully stabilized 10ScSZ is the outside layer, has intermediate strength between the conventional 10 ScSZ and 6 ScSZ substrates.

This indicates that having a partially stabilized layer on the outside is preferable for achieving high mechanical strength in the laminates.

TABLE 2

Mechanical Strength of Conventional Single Layer Substrates And Multi-Layer Electrolyte Structures

| Specimen Index Description | YSZ | Example 1 6ScSZ | 10ScSZ | Example 2 6d/10d/6d | Example 3 6d/10d-10d/6d | Example 4 6d/10d-10d-10d/6d | Example 5 0d/6d, 6d/10 |
|---|---|---|---|---|---|---|---|
| Average strength (MPa) and 95% confident interval | 187.1 ± 44.9 | 670.1 ± 280.2 | 310.0 ± 148.1 | 737.4 ± 186.0 | 909.1 ± 241.3 | 870.6 ± 75.2 | 528.8 ± 174.3 |
| Weibull characteristic strength (MPa) | 197 | 733.5 | 343.4 | 778.2 | 967.1 | 886.25 | 565.1 |
| Weibull modulus | 9 | 4.74 | 3.97 | 8.31 | 7.28 | 25.22 | 6.7 |

The invention further includes electrodes and electrochemical cells including laminate structures such as those described above. An anode or cathode may be prepared by applying the corresponding composition to an outer surface of the laminate structure. The anode preferably is selected from a nickel-electrolyte cermet, including but not limited to Ni-YSZ, Ni-GDC, and Ni-ScSZ, and a conductive ceramic oxide, including but not limited to lanthanum chromite and a doped-strontium titanate. The cathode preferably is selected from a doped rare-earth manganite, including but not limited to lanthanum strontium manganite, a doped rare-earth ferrite, including but not limited to lanthanum strontium ferrite, a doped-rare earth cobaltite, including but not limited to a lanthanum strontium cobaltite, a mixture thereof, and a solid solution thereof. An electrochemical cell may be prepared by applying an anode to an outer surface of the laminate structure (e.g., a tri-layer (6/10/6) ScSZ electrolyte plate) and applying a cathode to the opposing surface of the laminate structure. The anode and cathode preferably are selected from the materials identified above.

Detailed descriptions of preparation of particular electrodes and electrochemical cells are provided below.

EXAMPLE 6

Preparation of Anode Electrode

A single coat of commercially available anode ink (60 wt % NiO/40 wt % GDC, Fuel Cell Materials) was screen printed (EKRA, E1) on a 10 cm×10 cm sintered electrolyte multilayer plate with the microstructure of Example 2. A 325-mesh screen (Anrich Microscreens) was used to deposit the ink. The sample was dried at 60° C. for 10 minutes. A single coat of commercially available anode ink (80 wt % NiO/YSZ, Fuel Cell Materials) was screen-printed (EKRA, E1) on top of the already-printed active layer using a 120 mesh screen (Anrich Microscreens). The sample was dried at 60° C. for 10 minutes. The sample was placed electrolyte side down on a clean porous setter and covered with a sintered NiO/YSZ substrate. Another porous setter was placed on top of the NiO/YSZ substrate. The electrolyte/anode component was then annealed at 1300° C. for 1 hours.

EXAMPLE 7

Application of Cathode Electrode

A single coat of commercially available cathode ink (60 wt % LSF-40/GDC, Fuel Cell Materials) was screen printed (EKRA, E1) using a 325 mesh screen (Anrich Microscreens) on the multi-layer electrolyte substrate of Example 7 with annealed anode. The sample was dried at 60° C. in a drying oven for 10 minutes. Two coats of commercially available cathode ink (LSF-40, Fuel Cell Materials) were screen-printed (EKRA, E1) on top of the already printed LSF/GDC ink using a 120 mesh screen (Anrich Microscreens). The sample was dried between each coat application at 60° C. for 10 minutes. The sample was annealed at 975° C. for 2 hours.

EXAMPLE 8

Preparation of an Electrolyte Supported Electrochemical Cell

Figure 6:
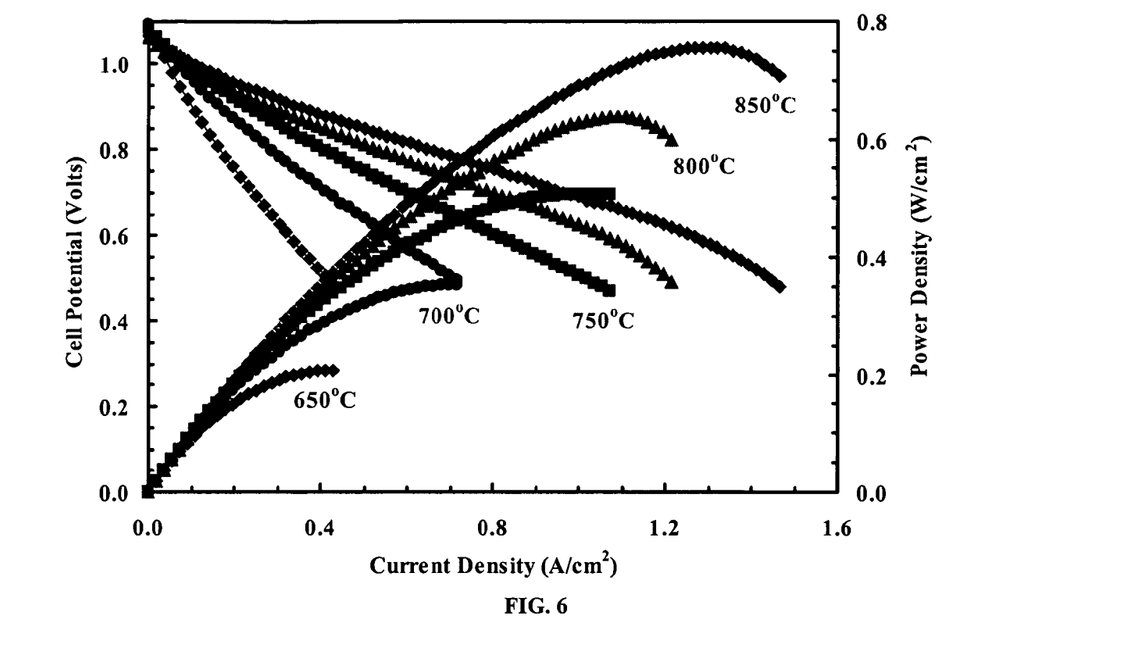
FIG. 6 is a graph showing the I-V and power density performance of a tri-layer ScSZ (6/10/6) electrolyte supported planar cell with a Ni/YSZ anode and a LSF-based cathode ($H_2$ flow of 650 cc/min).

A fuel cell prepared as described in Examples 6 and 7 was tested to evaluate performance. The cell was heated to 850° C. between Inconel manifolds, which served to distribute the fuel and air gases over the respective anode and cathode sides. The manifolds also served as current collectors for the test. A current density-voltage and current density-power density curve were generated for each of the two cells, at a fuel flow rate of 650 standard cubic centimeters of hydrogen per minute and an air flow rate of 1500 standard cubic centimeters of air per minute. After completing the test curve at 850° C., the temperature was lowered in 50° C. increments and the performance measured. The resultant curves are shown in FIG. 6. The maximum high power density shown in FIG. 6 (~0.75 $W/cm^2$) indicates high performance electrolyte supported cells can be successfully produced by this route.

The preferred embodiment of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. For example, the laminate structures of the present invention are described by reference to examples of symmetrical laminate structures. While it is believed that symmetrical structures enhance the strength of laminates prepared using fully stabilized zirconia compositions in all layers, the present invention is not limited to symmetrical laminate structures. Asymmetrical laminate structures may offer advantages in particular applications. The descriptions and disclosures herein are intended solely for purposes of illustration and should not be construed as limiting the scope of the present invention which is described by the following claims.

What is claimed is:

1. A self-supporting laminate electrolyte structure, comprising:
   a first electrolyte sheet comprising a first ceramic material;
   a second electrolyte sheet comprising a second ceramic material positioned above the first electrolyte sheet; and a third electrolyte sheet comprising the first ceramic material positioned above the second electrolyte sheet;
wherein the first ceramic material is a partially stabilized zirconia composition and the second ceramic material is a fully stabilized zirconia composition and the electrolyte sheets are laminated and sintered and form a composite electrolyte structure.

2. The self-supporting laminate electrolyte structure of claim 1, wherein the first and second ceramic materials are scandia-stabilized zirconia compositions.

3. The self-supporting laminate electrolyte structure of claim 1, wherein the first and second ceramic materials are yttria-stabilized zirconia compositions.

4. The self-supporting laminate electrolyte structure of claim 2, wherein the first ceramic material is a 6 mol % scandia-stabilized zirconia composition and the second ceramic material is a 10 mol % scandia-stabilized zirconia composition.

5. The self-supporting laminate electrolyte structure of claim 3, wherein the first ceramic material is a 6 mol % yttria-stabilized zirconia composition and the second ceramic material is a 10 mol % yttria-stabilized zirconia composition.

6. The self-supporting laminate electrolyte structure of claim 1, wherein the first ceramic material comprises yttria-stabilized zirconia and the second ceramic material comprises scandia-stabilized zirconia composition.

7. The self-supporting laminate electrolyte structure of claim 1, wherein the thickness of the second ceramic material is greater than the thickness of an adjacent electrolyte sheet of the first ceramic material.

8. The self-supporting laminate electrolyte structure of claim 1, wherein the composite electrolyte structure is symmetrical.

9. The self-supporting laminate electrolyte structure of claim 1, wherein the first ceramic material has a higher mechanical strength as compared with the second ceramic material and the second ceramic material has a higher ionic conductivity as compared with the first ceramic material.

10. An electrolyte-supported anode, comprising:
the self-supporting laminate electrolyte structure of claim 1; and
an anode applied to an outer electrolyte sheet of the composite electrolyte structure.

11. The electrolyte-supported anode of claim 10, wherein the anode is selected from a nickel-electrolyte cermet and a conductive ceramic oxide.

12. An electrolyte-supported cathode, comprising:
the self-supporting laminate electrolyte structure of claim 1; and
a cathode applied to an outer electrolyte sheet of the composite electrolyte structure.

13. The electrolyte-supported cathode of claim 12, wherein the cathode is selected from a doped rare-earth manganite, a doped rare-earth ferrite, a doped-rare earth cobaltite, a mixture thereof, and a solid solution thereof.

14. An electrolyte-supported electrochemical cell, comprising:
the self-supporting laminate electrolyte structure of claim 1;
an anode applied to an outer electrolyte sheet of the composite electrolyte structure; and
a cathode applied to an other outer electrolyte sheet of the composite electrolyte structure.

15. The electrochemical cell of claim 14, wherein the anode is selected from a nickel-electrolyte cermet and a conductive ceramic oxide and the cathode is selected from a doped rare-earth manganite, a doped rare-earth ferrite, a doped-rare earth cobaltite, a mixture thereof, and a solid solution thereof.

16. A laminate structure, comprising:
a sintered and self-supporting electrolyte laminate that includes;
a first electrolyte sheet of a first ceramic material;
a second electrolyte sheet of a second ceramic material positioned above the first electrolyte sheet; and
a third electrolyte sheet of the first ceramic material positioned above the second electrolyte sheet,
wherein the first ceramic material is a partially stabilized zirconia composition and the second ceramic material is a fully stabilized zirconia composition.

17. The self-supporting laminate electrolyte structure of claim 16, wherein the first and second ceramic materials are scandia-stabilized zirconia compositions.

18. The self-supporting laminate electrolyte structure of claim 16, wherein the first and second ceramic materials are yttria-stabilized zirconia compositions.

19. The self-supporting laminate electrolyte structure of claim 16, wherein the first ceramic material comprises yttria-stabilized zirconia and the second ceramic material comprises scandia-stabilized zirconia composition.

20. An electrolyte-supported electrochemical cell, comprising:
the self-supporting laminate electrolyte structure of claim 16;
an anode applied to an outer electrolyte sheet of the composite electrolyte structure; and
a cathode applied to an other outer electrolyte sheet of the composite electrolyte structure.

21. The electrochemical cell of claim 20, wherein the anode is selected from a nickel-electrolyte cermet and a conductive ceramic oxide and the cathode is selected from a doped rare-earth manganite, a doped rare-earth ferrite, a doped-rare earth cobaltite, a mixture thereof, and a solid solution thereof.

22. A self-supporting laminate electrolyte structure, comprising:
a first electrolyte sheet comprising a first ceramic material;
a second electrolyte sheet comprising a second ceramic material positioned on the first electrolyte sheet; and
a third electrolyte sheet comprising the first ceramic material positioned on the second electrolyte sheet;
wherein the first ceramic material is a partially stabilized zirconia composition and the second ceramic material is a fully stabilized zirconia composition and the electrolyte sheets are laminated and sintered and form a composite electrolyte structure.

23. A method of making a self-supporting laminate electrolyte structure, comprising the steps of:
providing a first electrolyte sheet comprising a first ceramic material;
positioning a second electrolyte sheet comprising a second ceramic material above the first electrolyte sheet;
positioning a third electrolyte sheet comprising the first ceramic material above the second electrolyte sheet;
wherein the first ceramic material is a partially stabilized zirconia composition and the second ceramic material is a fully stabilized zirconia composition; and,
laminating and sintering the electrolyte sheets to form a composite electrolyte structure.

24. A method of making an electrolyte-supported anode, comprising the step of:

applying an anode to an outer electrolyte sheet of the composite electrolyte structure prepared according to the method of claim 23.

25. The method of claim 24, further comprising the step of:
selecting an anode from a nickel-electrolyte cermet and a conductive ceramic oxide.

26. A method of making an electrolyte-supported cathode, comprising the step of:
applying a cathode to an outer electrolyte sheet of the composite electrolyte structure prepared according to the method of claim 23.

27. The method of claim 26, further comprising the step of:
selecting a cathode from doped rare-earth manganite, a doped rare-earth ferrite, a doped-rare earth cobaltite, a mixture thereof, and a solid solution thereof.

28. A method of making an electrolyte-supported electrochemical cell, comprising the steps of:
applying an anode to an outer surface of the composite electrolyte structure prepared according to the method of claim 23, and
applying a cathode to the other outer electrolyte sheet of the composite electrolyte structure.

29. The method of claim 28, further comprising the steps of:
selecting an anode from a nickel-electrolyte cermet and a conductive ceramic oxide; and
selecting a cathode from a doped rare-earth manganite, a doped rare-earth ferrite, a doped-rare earth cobaltite, a mixture thereof, and a solid solution thereof.

\* \* \* \* \*